(12) United States Patent
Counts et al.

(10) Patent No.: US 8,219,133 B2
(45) Date of Patent: *Jul. 10, 2012

(54) IMPLICIT GROUP FORMATION AROUND FEED CONTENT FOR MOBILE DEVICES

(75) Inventors: Scott J. Counts, Seattle, WA (US); Shelly D. Farnham, Seattle, WA (US); Jordan L K Schwartz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 60 days.

This patent is subject to a terminal disclaimer.

(21) Appl. No.: 12/698,737

(22) Filed: Feb. 2, 2010

(65) Prior Publication Data

US 2010/0137010 A1   Jun. 3, 2010

Related U.S. Application Data

(63) Continuation of application No. 11/203,875, filed on Aug. 15, 2005, now Pat. No. 7,684,815, which is a continuation-in-part of application No. 11/111,017, filed on Apr. 21, 2005.

(51) Int. Cl.
*H04B 7/00* (2006.01)

(52) U.S. Cl. ........ 455/517; 455/518; 455/519; 455/520; 455/521; 709/204; 709/205; 709/207; 709/227; 709/231

(58) Field of Classification Search .......... 455/517–521; 709/204–207, 227–232
See application file for complete search history.

(56) References Cited

U.S. PATENT DOCUMENTS

| | | | |
|---|---|---|---|
| 5,813,007 A | 9/1998 | Nielsen | |
| 6,772,229 B1* | 8/2004 | Achacoso et al. | 710/4 |
| 7,031,728 B2 | 4/2006 | Beyer | |
| 7,284,033 B2 | 10/2007 | Jhanji | |
| 7,398,081 B2 | 7/2008 | Moran | |
| 7,957,723 B2* | 6/2011 | Punaganti Venkata et al. | 455/412.1 |
| 2002/0086676 A1 | 7/2002 | Hendrey et al. | |
| 2002/0112239 A1 | 8/2002 | Goldman | |
| 2002/0128030 A1 | 9/2002 | Eiden et al. | |

(Continued)

OTHER PUBLICATIONS

Final Office Action of U.S. Appl. No. 11/111,017, mailed Apr. 12, 2010.

(Continued)

*Primary Examiner* — Fayyaz Alam
(74) *Attorney, Agent, or Firm* — Shook Hardy & Bacon LLP

(57) ABSTRACT

A unique system and method that facilitates group-based mobile communication around external feed content is provided. The system and method involve adding external feed content to content generated within a group. Both types of content can be viewed on the mobile devices of the group. Updates to the feed content can be obtained and communicated to the group. When multiple feeds are subscribed to by a group, one or more group members can display such feed content in a selective manner. For example, splinter groups can be formed off of the original group for members who wish to receive a subset of feeds (feed content) to assist them in focusing on a topic of interest. Group members can also employ display filters to restrict feed content displayed on their mobile devices. Users can also search for available feeds and form new groups around such content or join an existing group.

8 Claims, 12 Drawing Sheets

U.S. PATENT DOCUMENTS

| | | |
|---|---|---|
| 2002/0138839 A1 | 9/2002 | Nihal |
| 2002/0156787 A1 | 10/2002 | Jameson et al. |
| 2003/0050986 A1 | 3/2003 | Matthews |
| 2003/0233419 A1 | 12/2003 | Beringer |
| 2004/0041836 A1 | 3/2004 | Zaner et al. |
| 2004/0172455 A1 | 9/2004 | Green et al. |
| 2004/0199582 A1 | 10/2004 | Kucharewski et al. |
| 2005/0033615 A1 | 2/2005 | Nguyen et al. |
| 2005/0080854 A1 | 4/2005 | Tervo |
| 2005/0091120 A1 | 4/2005 | Auletta |
| 2005/0181722 A1 | 8/2005 | Kopra et al. |
| 2005/0198125 A1 | 9/2005 | Macleod Beck et al. |
| 2006/0004843 A1 | 1/2006 | Tafoya et al. |
| 2006/0036695 A1 | 2/2006 | Rolnik |
| 2006/0052091 A1 | 3/2006 | Onyon et al. |
| 2006/0072721 A1 | 4/2006 | Wisniewski |
| 2006/0073812 A1* | 4/2006 | Punaganti Venkata et al. ............ 455/412.1 |
| 2006/0085419 A1 | 4/2006 | Rosen |
| 2006/0128364 A1 | 6/2006 | Costa-Requena et al. |
| 2007/0112845 A1 | 5/2007 | Gilmour et al. |

OTHER PUBLICATIONS

Evite: Free Online Invitations and Local Event Listings, http://www.evite.com/pages/gt/about.jsp, last viewed Apr. 11, 2005.

Grouper Press Kit, http://www.grouper.com/about/presskit.htm, last viewed Apr. 11, 2005.

http://www.feedburner.com/fb/a/msf, last viewed Sep. 28, 2005, 2 pages.

MSN Groups, http://groups.msn.com, last viewed Apr. 11, 2005.

Final Office Action of U.S. Appl. No. 11/111,017, mailed Apr. 16, 2009.

Social Computing Group, http://research.microsoft.com/scg, last viewed Apr. 11, 2005.

TxtMob, http://www.txtmob.com, last viewed Apr. 11, 2005.

Non Final Office Action of U.S. Appl. No. 11/111,017, mailed Jan. 4, 2011.

Non Final Office Action of U.S. Appl. No. 11/111,017, mailed Sep. 17, 2009.

Final Office Action of U.S. Appl. No. 11/111,017, Mailed Jun. 27, 2011.

\* cited by examiner

EXEMPLARY HOME DISPLAY OF
GROUP-BASED COMMUNICATION APPLICATION

IMPLICIT GROUP FORMATION AROUND FEED CONTENT FOR MOBILE DEVICES

CROSS-REFERENCE TO RELATED APPLICATION

This application is a continuation of U.S. application Ser. No. 11/203,875, filed Aug. 15, 2005. U.S. application Ser. No. 11/203,875 is a continuation-in-part of U.S. application Ser. No. 11/111,017, entitled Dynamic Group Formation for Social Interaction and filed on Apr. 21, 2005. Both U.S. application Ser. No. 11/203,875 and U.S. application Ser. No. 11/111,017 are incorporated herein by reference.

BACKGROUND

The last ten years has seen mobile devices revolutionize how people communicate, coordinate, and socialize. For example, mobile phones have become an integral part of the feeling of connectedness that friends and family share with one another, allowing them to keep in touch regardless of location. While voice communication is highly natural and expressive, it also requires immediate attention, occasional privacy, quiet surroundings, and does not scale well for coordinating within medium or large groups of people.

Text messaging, also know as SMS (Short Message Service), is a lightweight text communication tool for mobile phones. As the name implies, messages are very short and typically limited to 160 characters for most encoding schemes. SMS allows one person with an SMS-enabled phone to send a text message to another person with an SMS-enabled phone. SMS-enabled phones are in widespread use in Europe and Japan and the use of SMS appears to be gaining acceptance in the United States.

Despite the many advancements of mobile device technology, communicating with more than one person at a time can be cumbersome, time consuming, and/or inconvenient particularly when dealing with time-sensitive information. Furthermore, with all the social uses of mobile phones, communication beyond the person-to-person scenario such as in a group setting can be rather challenging. Virtually all existing mobile communication and photo-sharing solutions are person to person. Phone calls are made one to one though a user may have the option of adding other individuals one-by-one. Text and photo messages can be sent to an individual or a list of individuals, but there is not a way for a group to communicate and share media as a group. Groups must be built up from a list of individuals one-by-one, and replies to messages go only to the sender. There is no persistence in groups over time. Thus, if one member of a family wishes to send a picture from their camera-phone to everyone else in their family, they must individually select each member and send it. Furthermore, comments about the photo would go only to the sender and when someone else wished to share another photo, they would have to build up the list of recipients again from scratch. Moreover, with all the social uses of mobile phones, effective group communication remains a challenge.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system(s) and/or methodology that facilitate integrating group-generated content with content from one or more external sources when communicating via a mobile device. In particular, content derived from a group of users such as text messages, voice messages, photos, or other media can be combined with information obtained from sources outside of the group. Examples of such sources include but are not limited to web blogs, data extracted from a website, and/or any other type of feed content that originates from outside the group including but not limited to an RSS (Real Simple Syndication) feed. Feeds can be text, audio, video, or any combination thereof.

According to one approach, this can be accomplished in part by a group subscription to one or more external feeds. More specifically, a group or group members can search for feeds based on topics of interest. The desired feeds can be selected and/or subscribed to by a group (as a group) or a group member. The selected feed can be communicated to the members of the group and appear on each member's mobile device. Members of the group can interact with the feed content such as by responding to it and exchanging other messages, comments, etc. with the other members of the group. Current group-based mobile communication systems do not allow for the combination of "within-group" content and external source content. Typically, group content has been limited to include only any messages, photos, and other media that have been created by the members of the group. However, external source content can often be quite relevant to user groups either for social, political, or business purposes.

In another approach, groups can form around feed content. Feed content can include, but is not limited to, live play-by-play updates such as from a sports game, comments by a pundit or any other who is not a member of the group, news stories on a particular topic, and the like. For example, imagine that a user performs an internet search on a topic of interest such as disco bowling. He locates an official website for the disco bowling association that includes disco bowling events at various bowling alleys per city and state as well as other useful information. The search results also may include existing disco bowling groups made up of disco bowling enthusiasts. In some cases, the search results may include both private and public groups. Membership to a private group is restricted whereas any user can join a public group. To readily distinguish between the two types, a user interface may graphically depict private groups differently from public groups.

Based on the search results, the user can subscribe to the feed from the official website and/or join an existing group or form a new group with his other disco bowling friends. Regardless of whether the user joins an existing group or creates a new group, the feed content becomes part of the overall group content. Thus, content in the group can stem from both the external feed data and the other group members.

For any relevant group, the feed from the external source can be updated periodically or as needed so that communication within the group remains current and any information exchanged in the group can be considered in real time. By their very nature, mobile devices have limited screen space and storage. Thus, some group members may not want to receive and/or view all of the feed content from the external source. To accommodate such members, the feed content received or displayed to a member can be customized per member. For example, a member can require that at least one other member of the group respond to the particular feed content before allowing that feed content to be received and/or displayed on the user's mobile device. In addition, a response, comment or other posting regarding the feed content from a specific member may be required. A threshold can also be set. For instance, the user may set a threshold for a volume of feedback combined with the quality of the feedback received about the feed content. When the threshold is satisfied, the relevant feed content can be communicated to and made visible to the user. Hence, the user can employ one or more other group members as a filter for any undesirable or uninteresting feed.

Alternatively or in addition, one or a subset of group members may determine that too much extraneous feed content is being received. When multiple feeds have been subscribed to by the group, some group members may determine that only one or a subset of them are truly of interest to them. Thus, such members can form a splinter or subgroup from the original group to only receive certain feeds or certain feed content.

To the accomplishment of the foregoing and related ends, certain illustrative aspects of the systems and methods discussed herein are described in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION

Figure 1:
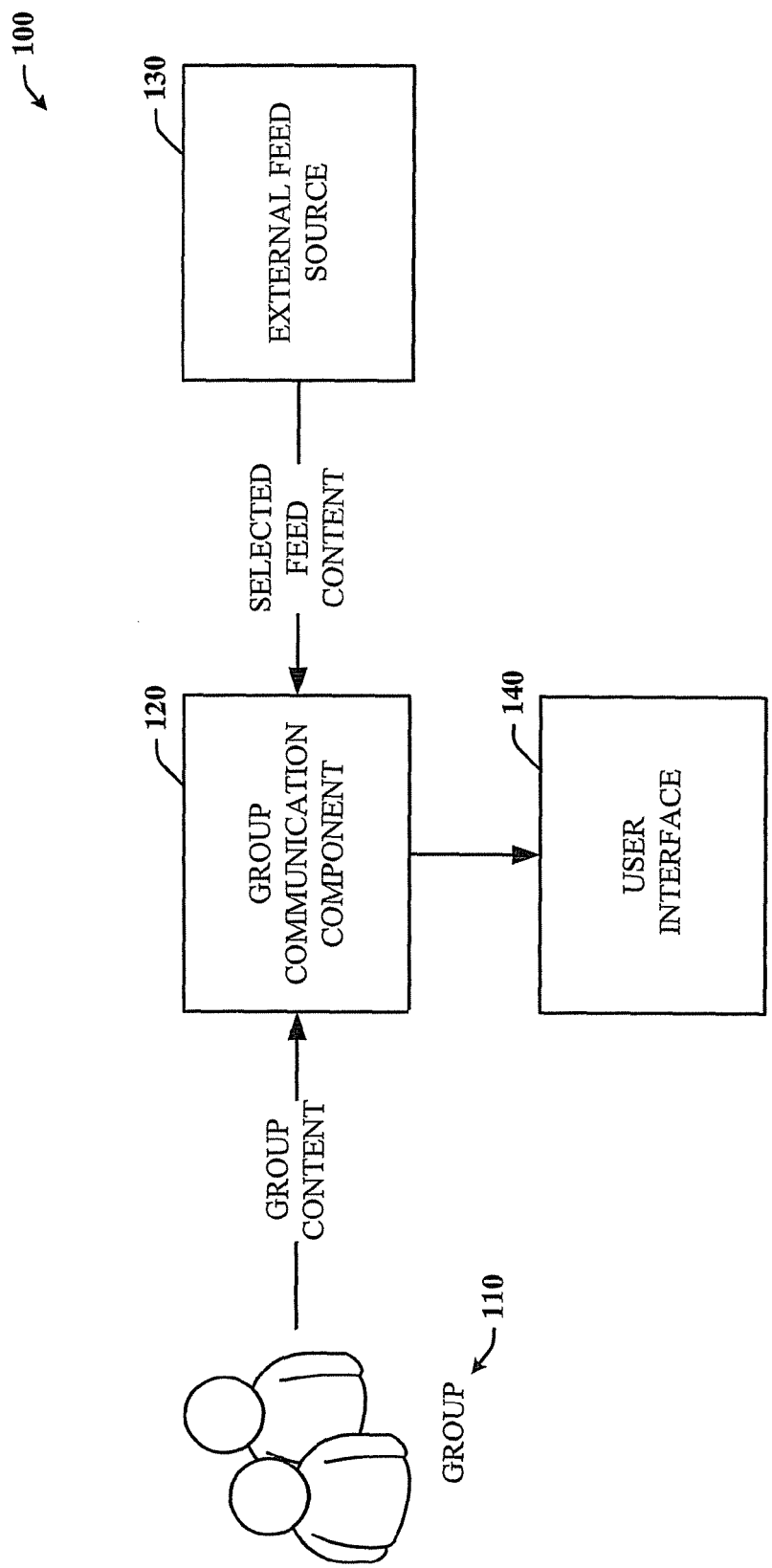
FIG. 1 is a block diagram of a group-based mobile communication system that facilitates integrating external feed content with group-generated content.

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject systems and/or methods can incorporate various inference schemes and/or techniques in connection with implicit group formation around feed content. In particular, when one user subscribes to an external source feed, the system and/or method can suggest inviting other particular contacts of the user to join the group as well based on the user's membership of other groups, the context of the user's groups, etc.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As mobile devices become more functional and more appropriate as media capture and consumption devices with greater bandwidth, the ease with which they can be used for group-based communication and media sharing increases. These groups could range from groups of friends and family doing group-wide text messaging and photo sharing to groups based on interest (e.g., Seattle Sonics basketball fans) doing the same. According to the systems and methods described herein, the total group content can be derived from group members (e.g., within-group content) and external source content. For example, the Seattle Sonics basketball fans group can include content from the Sonics organization in their interactions as well as personal content from the members such as their comments about the players, the most recent game, pictures with players, and the like. External source content can often be very relevant to communication groups, and in fact many groups may want to form around content from an external source.

Such group-based mobile communication can be carried out using wireless carrier protocols including SMS and HTTP protocols. To increase revenues, wireless carriers can charge per message or per communication sent to the group or between members of the group. Special or reduced charges can be assigned for communications sent between mobile devices operating on the same carrier.

Referring now to FIG. 1, there is a general block diagram of a group-based mobile communication system 100 that facilitates integrating external source content with content generated within a group 110. The system 100 for mobile devices enables groups of people to form around and communicate about content from sources outside of the group—in addition to content provided by its members. The external content source can take the form of a feed such as an RSS feed. By doing so, communication within the group can be more effective, meaningful, and efficient for its members.

The system 100 includes a group communication component 120 that can receive both group content (e.g., group generated content) as well as selected feed content from an external feed source 130 using HTTP protocols, for example. Group content can include text and other media communicated between group members. The selected feed content can include feeds from one or more external sources as subscribed to by the group (as a group) or by at least one member of the group. The group communication component 120 can organize the feed and group content into a readable and logical format and display it via a user interface 140 to the members of the group on their mobile devices. It should be appreciated that the user interface 140 can be customized by each member on their particular mobile device. Because one user may be a member of multiple groups, the user interface 140 can display a representative graphic for each group or the group name and indicate that new content either from a feed or from a member has been received.

Figure 2:
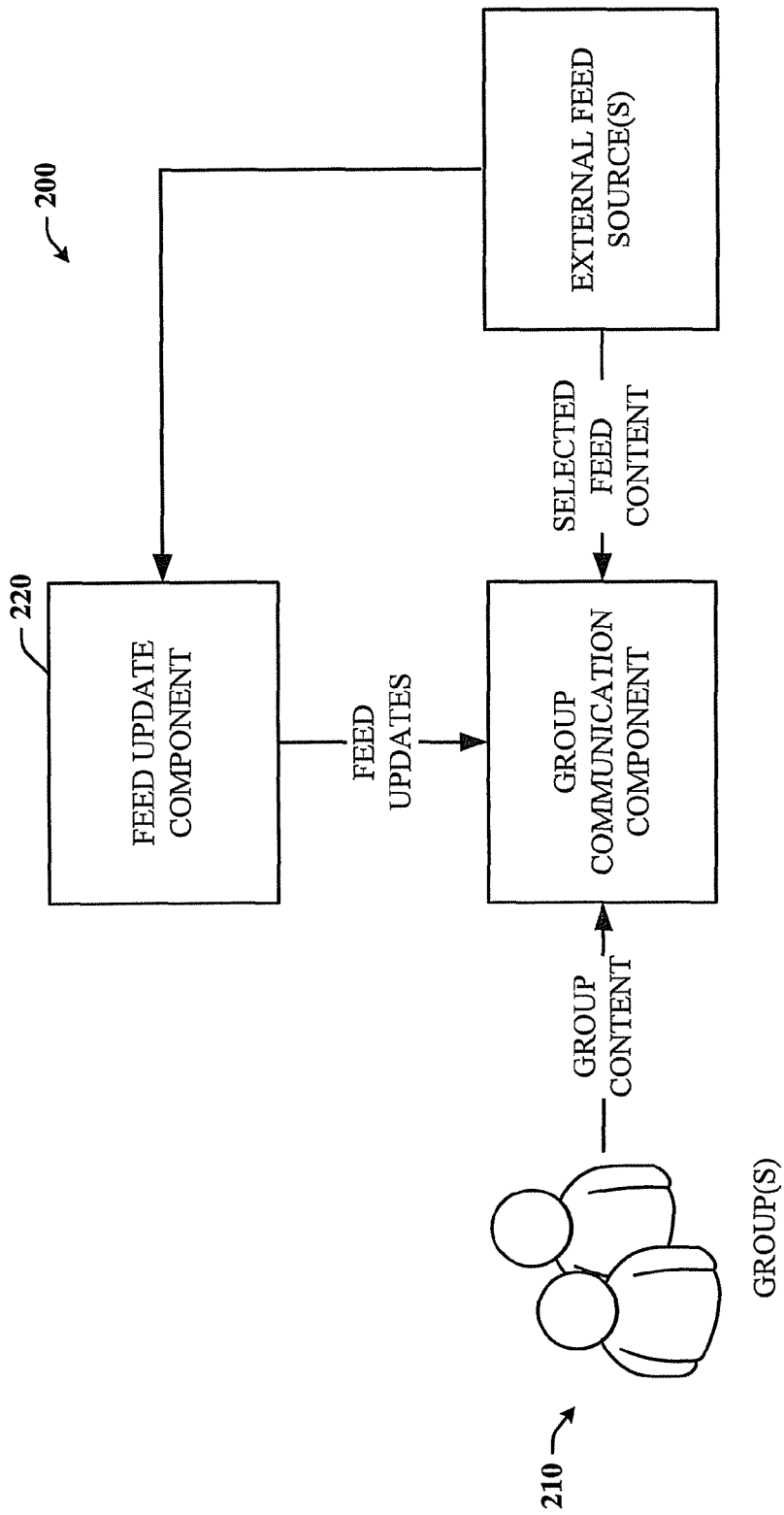
FIG. 2 is a block diagram of a group-based mobile communication system that facilitates obtaining updated feed content from the respective feed sources.

FIG. 2 demonstrates a general block diagram of a group-based mobile communication system 200 that facilitates updating any relevant feed content that has been subscribed to by a group 210. In particular, the system 200 is very similar to the system 100 of FIG. 1, supra. The system 200 includes a feed update component 220 that can check for new or updated feed content. If any updates or new feed content is found, then the feed update component 220 can update the respective mobile devices for those groups who have subscribed to the particular feed. The system 200 can check for new feed information periodically at scheduled times as determined by the group or a member of the group or randomly on demand as desired by the group or group member. In addition, the system 200 can monitor the feed source and obtain new feed content from the source as it appears (or when published by or at the source) in real time.

In practice, any one group can subscribe to multiple feeds either from one external source or from multiple sources. For example, a baseball-loving family forms a group for communicating via their mobile devices. They all enjoy reading, listening, and watching game action and news about the leagues and players; and as a result, the group has subscribed to a plurality of feeds corresponding to the Major League Baseball website as well as individual team pages. However, some of the members may really only be interested in the Seattle Mariners or the Mariners may be in contention for a division title and these members may wish to focus their attention on them temporarily (or permanently). Such members can form a splinter or subgroup off of the original group around the desired feed content as demonstrated by the system 300 in FIG. 3.

The system 300 facilitates the formation or configuration of smaller groups 310 that can be derived from the initial group 320 in order to accommodate group members who may desire to receive a subset of the feed content subscribed to by the initial group 320. Thus, a group formation component 330 receives the desired feed content and a subgroup 310 having at least one member can form. This subgroup 310 can generate content as well as receive communications from members in both the subgroup 310 and the initial group 320. The difference between the subgroup and initial group may only be the feed content received by each, depending on the preferences of the subgroup. In addition to blocking the reception of one or more feeds, it should be appreciated that the subgroup can also block group generated content as it relates to the blocked feed content. By doing so, the subgroup can maintain the focus it desires. Though not illustrated in the figure, other sub-groups can be formed off of existing splinter groups. This can occur when a member of an existing splinter group wishes to further focus on a particular feed.

Figure 3:
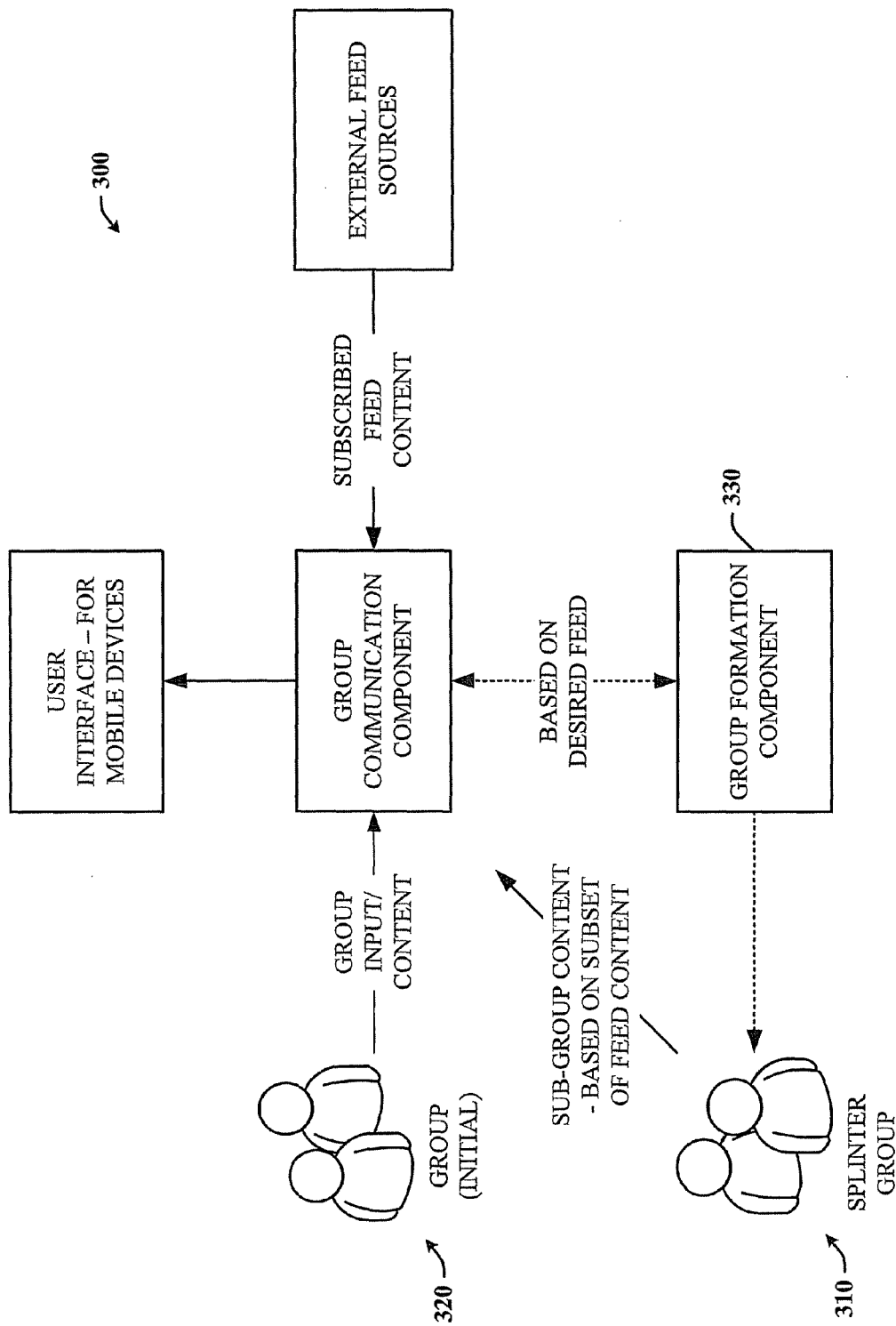
FIG. 3 is a block diagram of a group-based mobile communication system that facilitates forming a subgroup around desired feed content.

As shown in FIGS. 1-3, supra, it may be assumed that a server component takes the feed and the group communication, aggregates them, and sends the resulting information on to the respective mobile clients. However, it should be appreciated that the clients can individually subscribe to the feed and to the group communication and perform the aggregation of the two data sources independently. For example, referring again to FIGS. 1 and 3, the external feed source can be connected directly to the mobile user interface (of each group member).

Figure 4:
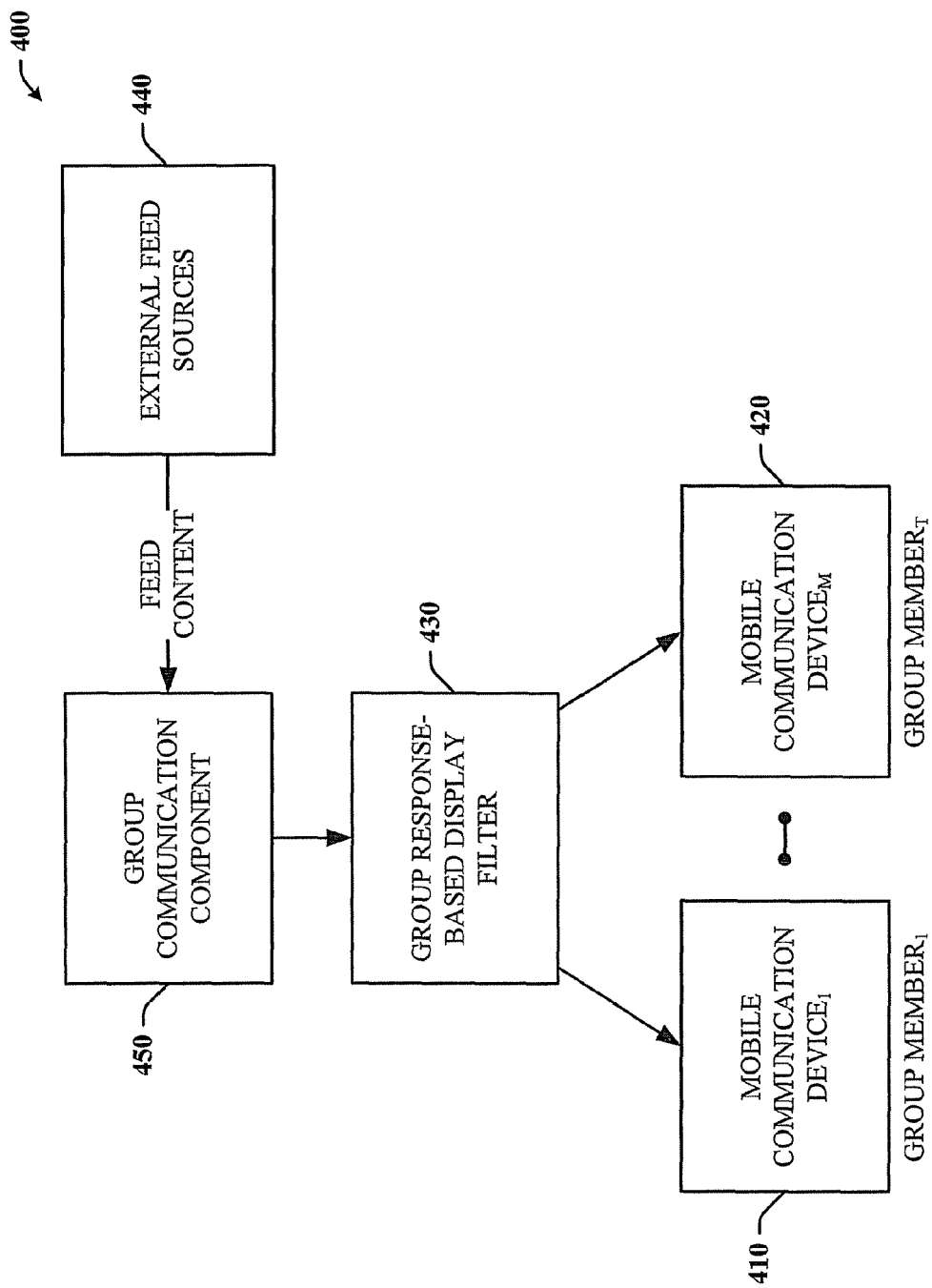
FIG. 4 is a block diagram of a group-based mobile communication system that facilitates selectively displaying feed content to one or more members of a group.

In general, the volume of content generated by feeds can be extremely high and not all of it may be relevant to the group or to certain members of the group. As an alternative or in addition to forming splinter groups, group communication can be employed to display content in a selective manner. This can be important for handling data overload on mobile devices and can be effective for controlling or managing feed content overall. The block diagram depicted in FIG. 4 represents a group-based mobile communication system 400 that facilitates selective display of feed content to one or more members 410, 420 of a group. The system 400 includes a group response-based display filter 430 that can be configured by a member to download only feed content which has been commented on by another group member. Hence, a group member can use his group memberships (e.g., social network) to filter his feed content.

As shown in the figure, an external feed source(s) 440 sends feed content to the group via a group communication component 450. For the mobile devices with a display filter 430 in place, the feed content gets passed through the filter 430 before being sent to the mobile device 410. If at least one other group member has commented on the feed content, then the content can be sent. Otherwise, the content is not communicated. The filter 430 can also set an expiration period that can essentially block any feed content from being communicated if no group member has commented on it within a prescribed time.

Figure 5:
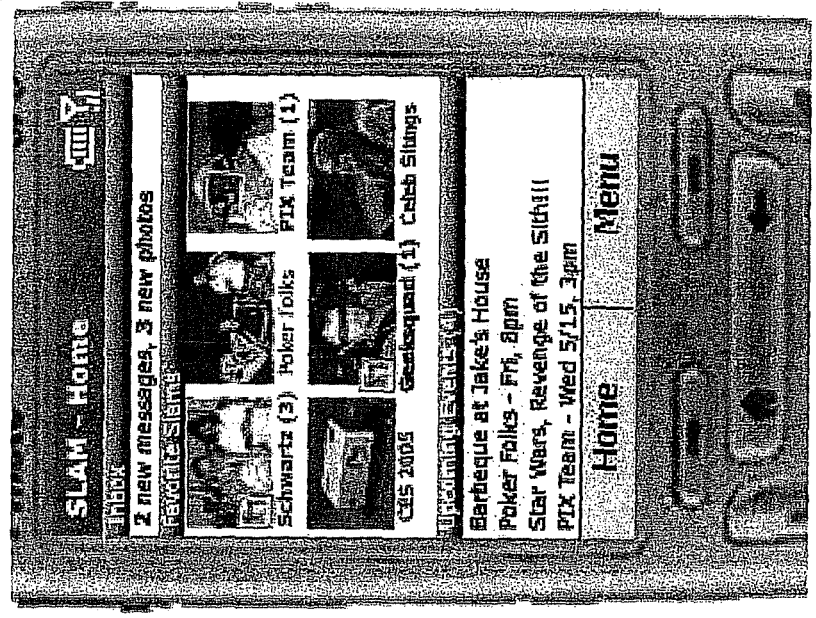
FIG. 5 is an exemplary screen shot of a group-based mobile communication application home page.
Figure 6:
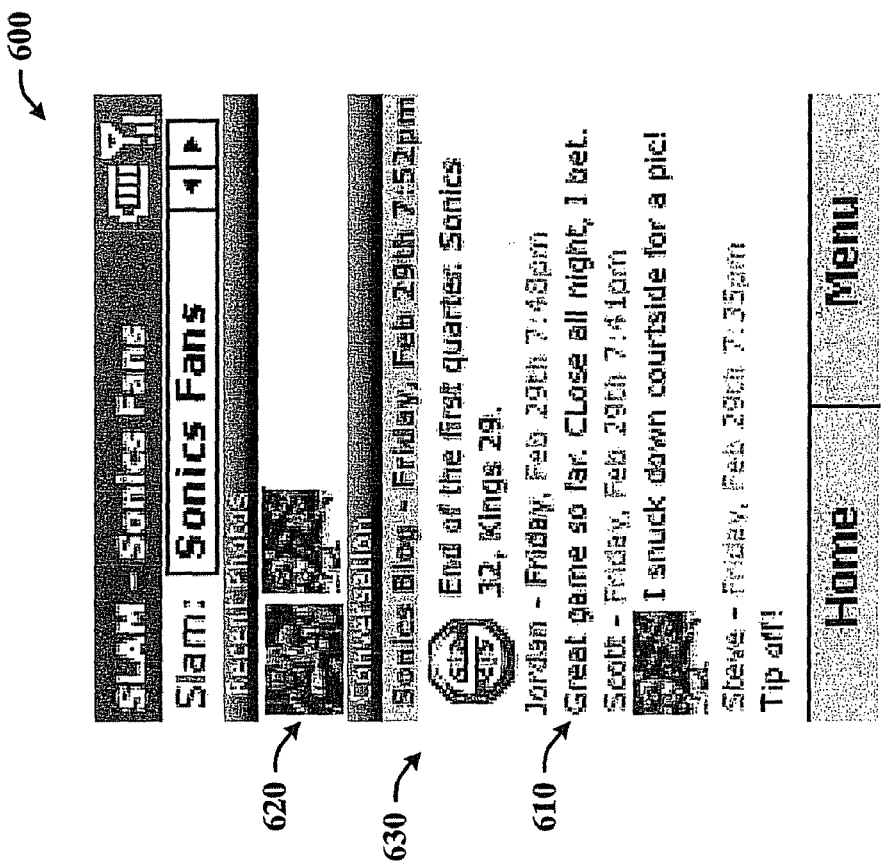
FIG. 6 is an exemplary screen shot of a group communication screen that demonstrates the integration of feed content with within-group content.
Figure 7:
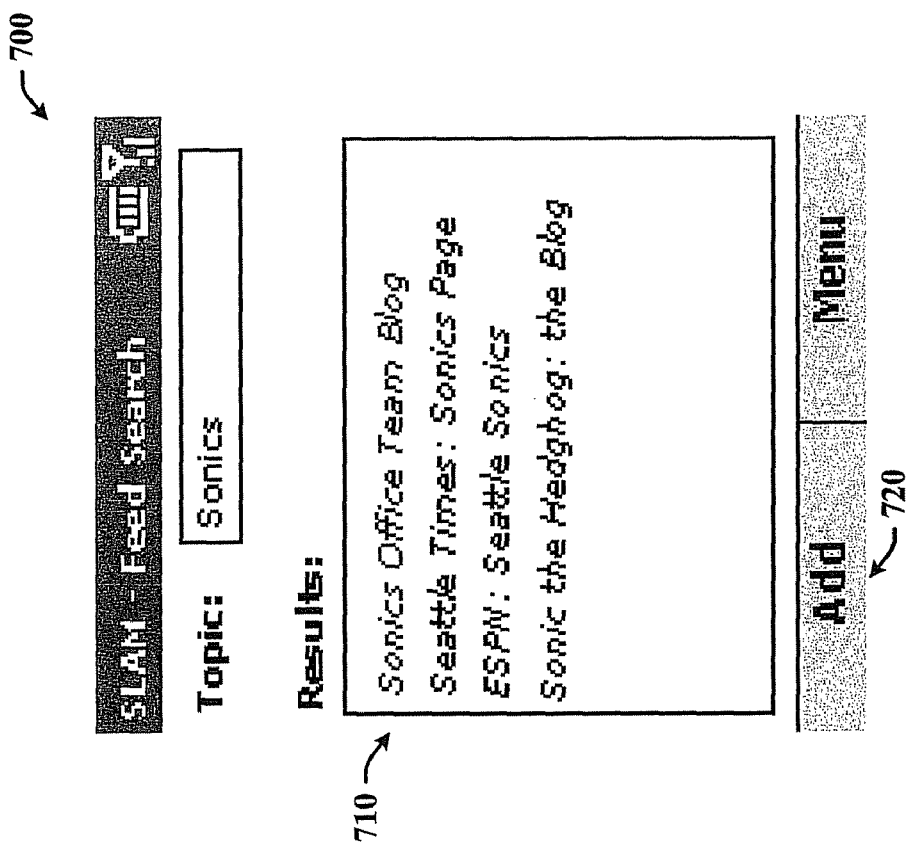
FIG. 7 is an exemplary screen shot of a feed search screen or page that a user can employ to search for feed sources and feed content as well as existing groups related to such feeds.

Moving on to FIGS. 5-7, there are illustrated screen shots of exemplary user interfaces that can be employed to facilitate the systems and methods described herein. It should be appreciated that while certain ways of displaying information to users are shown and described with respect to certain figures as screen shots, those skilled in the relevant art will recognize that various other alternatives can be employed. The terms "screen" and "display" are generally used interchangeably herein. The content shown on the screens or displays are stored and/or transmitted as display descriptions, graphical user interfaces, or by other methods of depicting information on a screen (whether personal computer, PDA, mobile telephone, or other suitable device, for example) where the layout and information or content to be displayed is stored in memory, database, or another storage facility.

In FIG. 5, the exemplary user interface 500 represents a home page view or display of a group-based communication application for a mobile device such as but not limited to a PDA, smart phone, and/or mobile phone. The application home page 500 shows the entry point to six groups. At this level, the user is notified of how much new content is ready to be read via the "(XX)" after the group name.

Suppose now that a user is a member of a group called Sonics Fans. Clicking on one this group shows the group content page—as illustrated in the user interface 600 of FIG. 6. Text 610 and media 620 (e.g., photos, etc.) content from each group member is listed in line with content from the feed, thus enabling group conversation around the feed content. In the screen shot, users have posted text and photo content about the game. The Sonic's official team blog feed 630 (entitled Sonics Blog on the user's mobile device display) has released a score update at the end of the first quarter that is integrated into the conversation.

Once a photo 620 has been shared with the group, it can be viewed by all members of the group on the mobile device in real-time and in the context of the group. It can also be viewed on other surfaces (e.g., Web UI, PC desktop client UI) in the context of the group or pivoted in other ways (e.g., by sender, by time sent, by location, etc.). In addition, the photos can also be synched from the server-based store to the mobile device as well as to the user's standard desktop PC-based photo library.

Furthermore, metadata relevant to usage can automatically be extrapolated and inserted into the media files, allowing for automatic organization (e.g., the fact that a photo was taken contemporaneously with an event implies that the photo is relevant to the event and this can be added as a label to the photo's metadata). Users can also comment on photos and other media taken or shared. These comments can form both off-shoot communications within the group as well as function as metadata on the photos themselves. When the photos are subsequently synchronized such as with a desktop PC, this information can be used for automatic organization.

As depicted in the user interface 700 of FIG. 7, feed content such as the Sonics Blog can be added to the group conversation by searching for key words that can match or be similar to either group names or feed title words. In FIG. 7, the group Sonics Fans is assumed to already exist. To add the Sonics Blog 710 or any other desired blog to this group (FIG. 6), the user can search for a relevant feed. Thus, this user has selected "Add" 720 or "Add Feed" from the menu of the Sonics Fans page.

Search results can include groups previously formed that are related to the feed search—in addition to a list of feeds or feed sources. When the user is not already a member of a group but desires membership thereto, the user may join such group(s) so long as the group has been designated as a public group. Public groups can be joined by virtually any user based on either the group name or the feed content through the search process. However, private groups may not be joined through the search process.

Private groups may be joined through an invitation from a group member and thus are typically smaller since membership is restricted. Membership can be controlled by a moderator or the existing membership. Publication to either the public or private group can be open (e.g., anyone in the group or anyone at all can post to the group) or controlled (e.g., only designated authors can post to the group). These two concepts can then be matrixed to form different use models. For example, a family group might control membership so that only family members can join but any of them can use it to communicate. A public interest group such as Friends of the Park might allow anyone to join and any member can post. A broadcast company could create a group that would receive reports from an on-the-scene journalist. Anyone could join but only the authors designated by the company could post (although all members might be allowed to post to a separate section of the group).

The first two examples (family group and public interest group) behave similar to a mobile chat room, whereas the last example is more like a mobile real-time participatory magazine. Private groups can serve the important function of allowing smaller groups (such as a work group or a group of friends) to include feed content in their group's interactions. For example, the IT group at a company might include a feed of IT related news or even an internal feed that tracks IT issues.

As an alternative to joining an existing group, the user can create a group (either public or private) based on the feed content from the menu list of the feed search screen (700).

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 8:
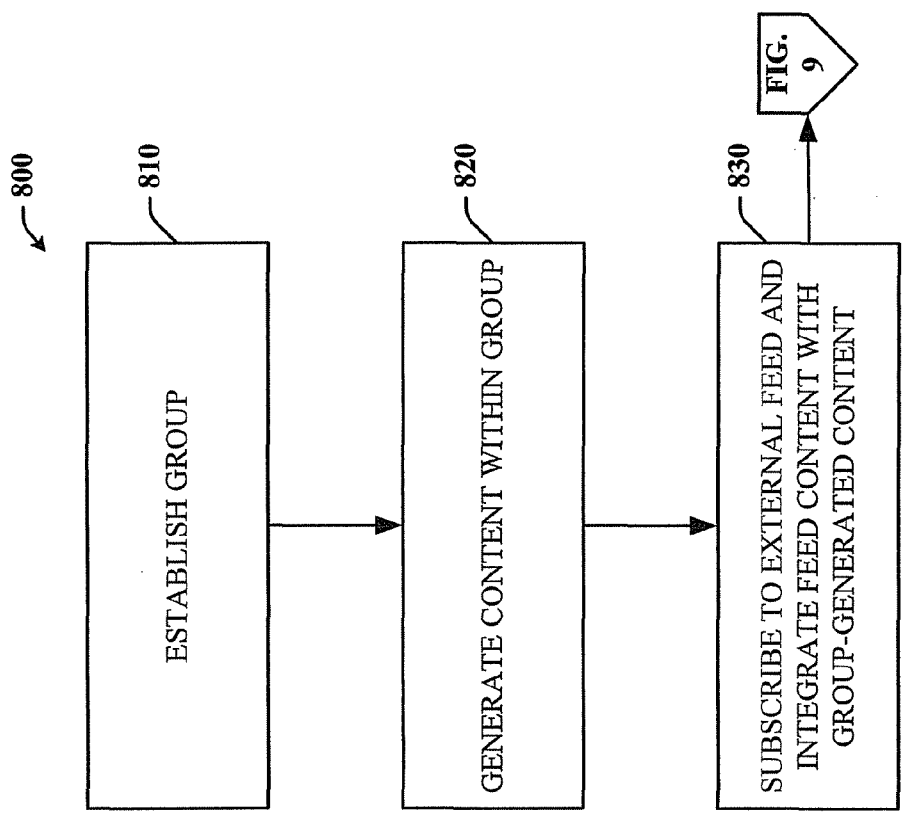
FIG. 8 is a flow chart illustrating an exemplary methodology that facilitates integrating feed content with group-generated content during group-based mobile communication.

Turning now to FIG. 8, there is a flow diagram of an exemplary methodology 800 that facilitates integrating external feed content with group-generated content in a group-based mobile communication environment. The method 800 involves establishing a group at 810. The group can include at least two people that are friends, colleagues, family, or strangers that share a common interest. At 820, the group can generate content such as text-based communications, voice-to-text messages, shared photos, and/or other media. The group may wish to obtain more information about certain topics of interest from independent sources outside of the group. Thus, at 830, any member of the group or the group itself can subscribe to an external feed. By doing so, the feed content can be integrated into the group-generated content. As a result, group communication can be enhanced through the addition of such outside input.

Groups can also form around the feed content. For example, imagine that a user is monitoring a feed about DC Comics and then decides to form a group around this content with his comic book buddies. The user can form the group and invite his friends, after which the members of the group can add their own content to the existing as well as any future feed content.

Figure 9:
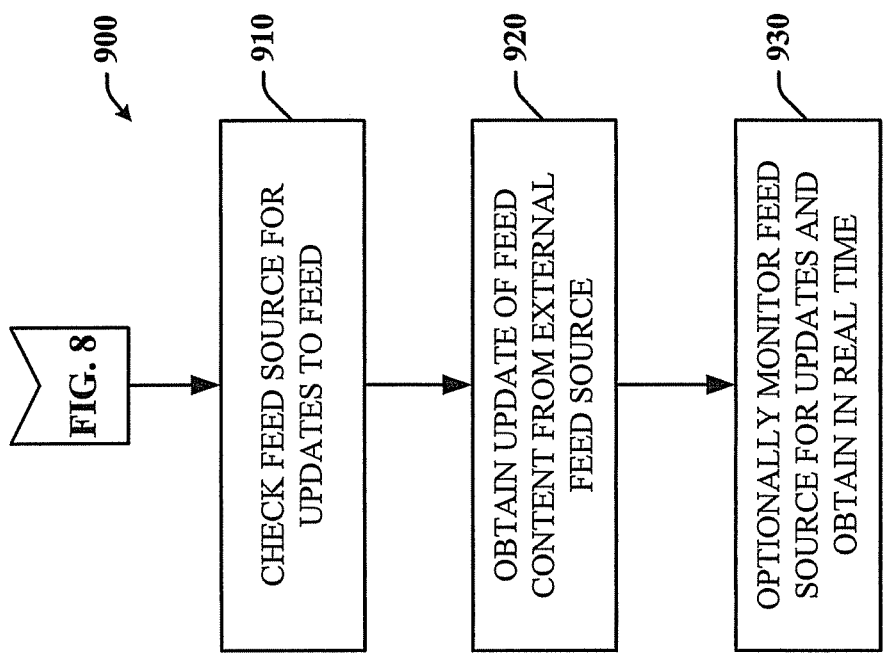
FIG. 9 is a flow chart illustrating an exemplary methodology that facilitates updating feed content.

Referring to FIG. 9, there is a flow diagram of an exemplary methodology 900 that facilitates updating feed content to the appropriate groups. The methodology 900 can continue from the method 800 as described in FIG. 8, supra, and involve checking the relevant feed sources for updates at 910. At 920, any new feed content can be obtained from the external feed source and communicated to the group via their mobile devices. It should be appreciated that updates to feed content can also be scheduled by the group to occur at determined time periods. Otherwise, they can be performed on demand as desired by the group or by any group member. At 930, the feed source can be monitored in real time to obtain updated feed content in real time. Feed content communicated to the group can be time-stamped so that the group is aware of its "age".

Figure 10:
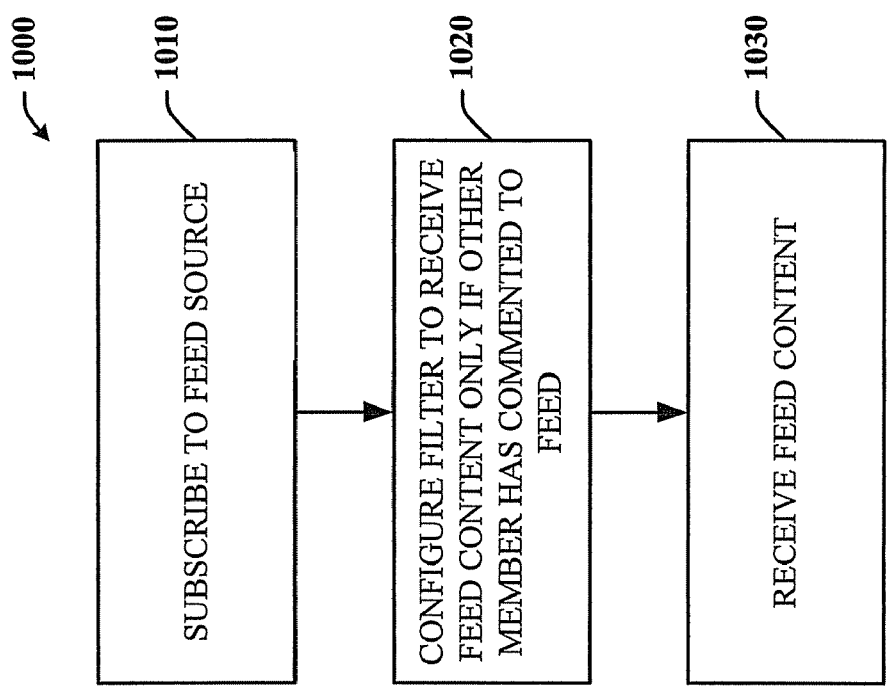
FIG. 10 is a flow chart illustrating an exemplary methodology that facilitates selectively displaying feed content on a group member's mobile device.

Feed content can be selectively displayed on any group member's mobile device according to the member's preferences. For example, as discussed in an exemplary methodology 1000 in FIG. 10, an external feed source can be subscribed to by a group at 1010. At 1020, a filter can be configured by at least one group member to only receive feed content that has been commented on by at least one other group member. At 1030, the appropriate feed content can be sent to and received by the member's mobile device assuming that the filter conditions have been satisfied.

Figure 11:
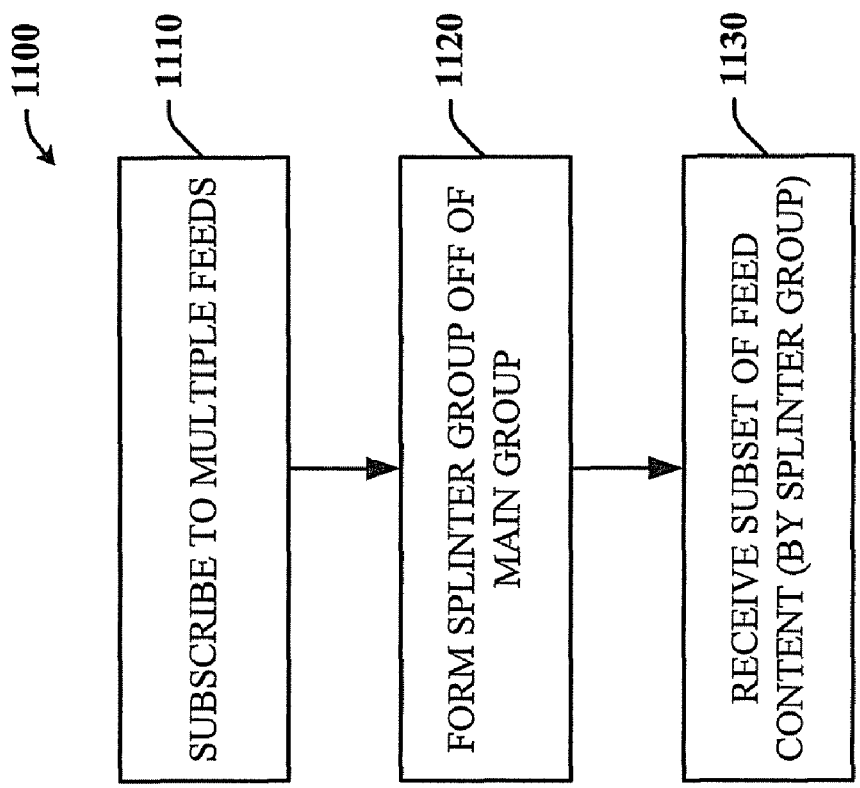
FIG. 11 is a flow chart illustrating an exemplary methodology that facilitates forming at least one subgroup off of an initial group in order to receive a subset of feed content from an external feed source.

In FIG. 11, the flow diagram illustrates an exemplary methodology 1100 that facilitates focusing on certain feed content. In particular, a group can subscribe to multiple feeds on similar, related, or different topics (at 1110). When a member of the group wishes to focus on a certain topic, the member can form a splinter or subgroup off of the original group at 1120. At 1130, the splinter or subgroup can receive a subset of the feeds (feed content) that the rest of the group receives.

Figure 12:
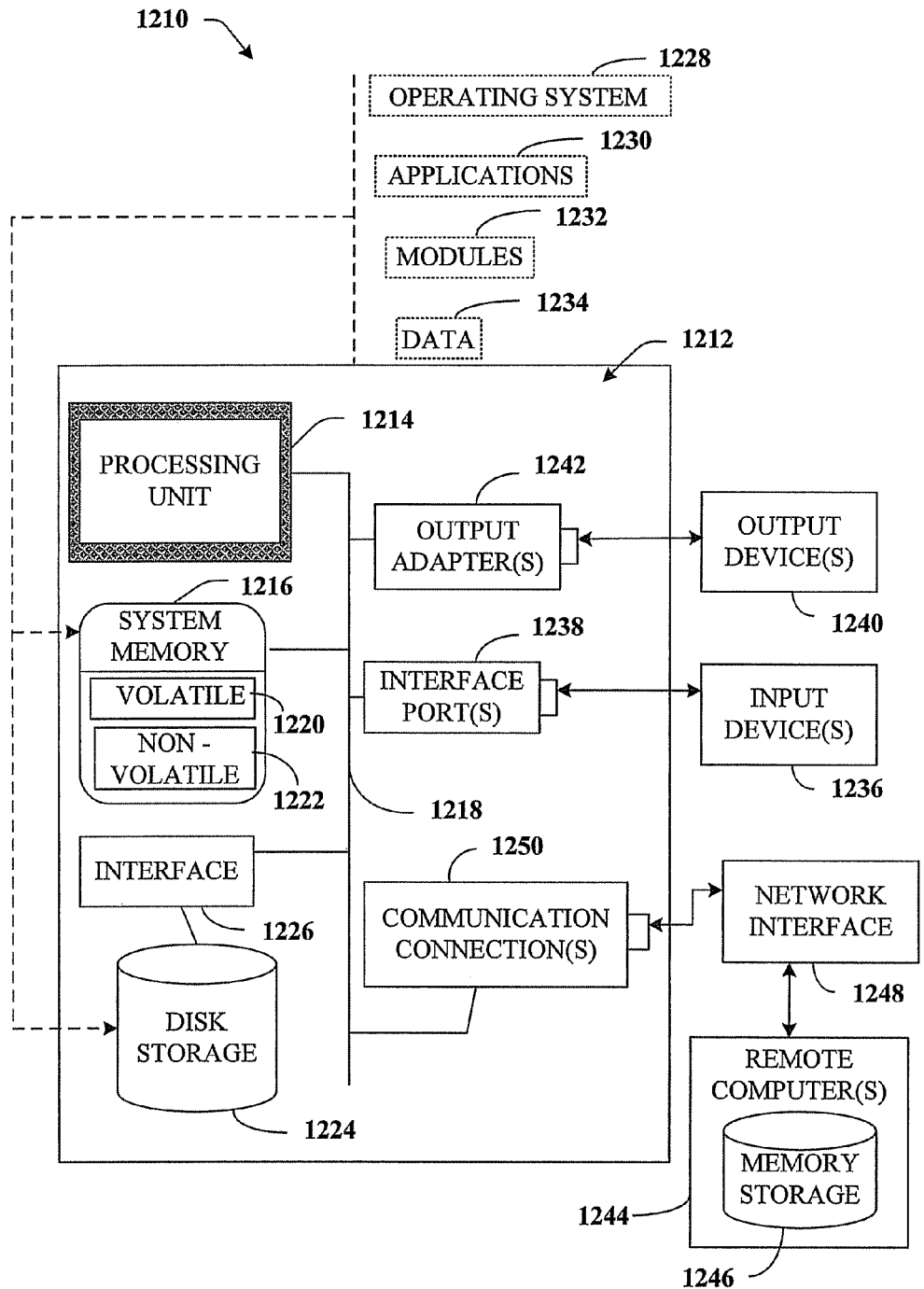
FIG. 12 illustrates an exemplary environment for implementing various aspects of the invention.

In order to provide additional context for various aspects of the subject application, FIG. 12 and the following discussion are intended to provide a brief, general description of a suitable operating environment 1210 in which various aspects of the subject application may be implemented. While the system(s) and/or method(s) is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 1210 is only one example of a suitable operating environment and is not intended to suggest any limitation as to the scope of use or functionality of the system and/or method. Other well known computer systems, environments, and/or configurations that may be suitable for use with the system and/or method include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 12, an exemplary environment 1210 for implementing various aspects of the system and/or method includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/nonremovable, volatile/nonvolatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject system and/or method can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212 and to output information from computer 1212 to an output device 1240. Output adapter 1242 is provided to illustrate that there are some output devices 1240 like monitors, speakers, and printers among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. Computer storage media storing computer-executable instructions that, when executed, cause a computing device to perform a method of integrating an external feed with a user-generated communication, the method comprising:
    transmitting the external feed to a first mobile device that belongs to a group of mobile devices,
        wherein each mobile device in the group of mobile devices has subscribed to be a member of the group, and
        wherein the external feed includes content that originates from a feed source that is external to the group of mobile devices;
    determining if the first mobile device transmits a comment in reply to the external feed;
    if the first mobile device does not transmit the comment, blocking-transfer of the external feed to a second mobile device of the group of mobile devices that has subscribed to be a member of the group; and
    if the first mobile device transmits the comment, transmitting the external feed to the second mobile device.

2. The media of claim 1, wherein determining if the first mobile device transmits the comment, includes determining if the first mobile device transmits the comment within a prescribed duration of time.

3. The media of claim 2, comprising:
    if the first mobile device does not transmit the comment prior to expiration of the duration of time, blocking transfer of the feed content to a second mobile device of the group of mobile devices; and
    if the first mobile device transmits the comment prior to expiration of the duration of time, transferring the feed content to the second mobile device.

4. The media of claim 1, wherein if the first mobile device transmits the comment, the method further comprises transferring text of the comment together with the external feed.

5. A method, which is carried out using a server, a processor, and computer-readable media, of integrating an external feed with a user-generated communication, the method comprising:
    transferring by the server the external feed to a first mobile device that belongs to a group of mobile devices, wherein the external feed originates from an external-feed source that is external to the group of mobile devices;
    determining by the processor if the first mobile device transmits the user-generated communication, which is in response to the external feed, within a prescribed duration of time;
    if the first mobile device does not transmit the user-generated communication prior to expiration of the duration of time, blocking transfer of the external feed to a second mobile device that belongs to the group of mobile devices; and
    if the first mobile device transmits the user-generated communication prior to expiration of the duration of time, transferring by the server the external feed to the second mobile device.

6. The method of claim 5 comprising, monitoring the external-feed source to obtain updates to the external feed in real time and communicating any updates to the group of mobile devices.

7. The method of claim 6 comprising, communicating the updates to the group of mobile devices on a scheduled basis.

8. The method of claim 6 comprising, communicating the updates to the group of mobile devices on demand by a group member.

* * * * *